(12) United States Patent
Dailey et al.

(10) Patent No.: US 6,248,200 B1
(45) Date of Patent: *Jun. 19, 2001

(54) METHOD OF MAKING A TRIM PANEL ASSEMBLY INCLUDING INTEGRAL ARM REST PORTION

(75) Inventors: Patrick M. Dailey, Orion Twp; Christopher Reynolds, Oxford; James T. Vanston, Highland Park, all of MI (US); Anthony J. Link, North Liberty, IA (US)

(73) Assignees: Chrysler Corporation, Auburn Hills; United Technologies Automotive, Dearborn, both of MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/954,019

(22) Filed: Oct. 20, 1997

Related U.S. Application Data

(62) Division of application No. 08/654,477, filed on May 28, 1996, now abandoned.

(51) Int. Cl.$^7$ .......................... B29C 70/78; B32B 31/04; B60J 5/00
(52) U.S. Cl. .......................... 156/245; 264/571; 264/250; 264/259
(58) Field of Search ..................... 156/245; 264/101, 264/250, 259, 328.1, 571

(56) References Cited

U.S. PATENT DOCUMENTS 5,626,382 * 5/1997 Johnson et al. ................... 296/146.7

OTHER PUBLICATIONS

Adhesives Handbook, J. Shields, p. 259, 1970.*

* cited by examiner

Primary Examiner—Adrienne C. Johnstone
(74) Attorney, Agent, or Firm—Roland A. Fuller, III

(57) ABSTRACT

A trim panel assembly for a door of a motor vehicle includes a trim panel substrate mounted on an inner panel of a door, a trim panel cover mounted on the trim panel substrate, and an arm rest portion formed by the trim panel substrate and trim panel cover extending longitudinally and inwardly into an occupant compartment of a motor vehicle and having an arm rest pad disposed between the trim panel cover and the trim panel substrate.

1 Claim, 1 Drawing Sheet

METHOD OF MAKING A TRIM PANEL ASSEMBLY INCLUDING INTEGRAL ARM REST PORTION

CROSS-REFERENCE TO RELATED APPLICATION

This application is a division of application Ser. No. 08/654,477, now abandoned, titled "Trim Panel Assembly" filed May 28, 1996 by the same inventors as in the present application.

BACKGROUND OF THE INVENTION

1. Field of the Invention

The present invention relates generally to doors for vehicles and, more particularly, to a trim panel assembly for a door of a motor vehicle.

2. Description of the Related Art

It is known to construct doors for motor vehicles such as automotive vehicles. Typically, the door includes an inner panel and outer panel joined to each other and connected to vehicle structure in a known manner. The door also includes a decorative trim panel mounted on the inner panel.

It is also known to provide an arm rest on the door to project inboard from the door trim panel to provide a convenient rest for an occupant's arm. The arm rest is typically made of a foam or honeycomb material molded to a substrate and covered with a cover. The arm rest is formed as a separate structure and attached to the door trim panel by conventional means such as fasteners. As a result, separate tooling is required for the cover, foam material and substrate which is undesired. Also, the separate arm rest requires more time for assembly and cost for manufacture. Thus, there is a need in the art to provide a door trim panel with a soft integral armrest which is less expensive to manufacture.

SUMMARY OF THE INVENTION

It is, therefore, one object of the present invention to provide a trim panel assembly for a door of a motor vehicle.

It is another object of the present invention to provide a trim panel assembly for a door having an integral arm rest portion.

It is yet another object of the present invention to provide a relatively soft arm rest portion for a trim panel assembly of a door without the need or cost of a separate add on arm rest.

It is still another object of the present invention to provide an arm rest portion for a trim panel assembly of a door which is less expensive to manufacture.

To achieve the foregoing objects, the present invention is a trim panel assembly for a door of a motor vehicle. The trim panel assembly includes a trim panel substrate mounted on an inner panel of a door and a trim panel cover mounted on the trim panel substrate. The trim panel assembly also includes an arm rest portion formed by the trim panel substrate and trim panel cover extending longitudinally and inwardly into an occupant compartment of a motor vehicle and having an arm rest pad disposed between the trim panel substrate and the trim panel cover.

One advantage of the present invention is that a trim panel assembly is provided for a door of a motor vehicle. Another advantage of the present invention is that the trim panel assembly has an integral arm rest portion. Yet another advantage of the present invention is that the arm rest portion is relatively soft. Still another advantage of the present invention is that the trim panel assembly provides an integral arm rest portion for a door of a motor vehicle which eliminates additional tooling and is less expensive.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
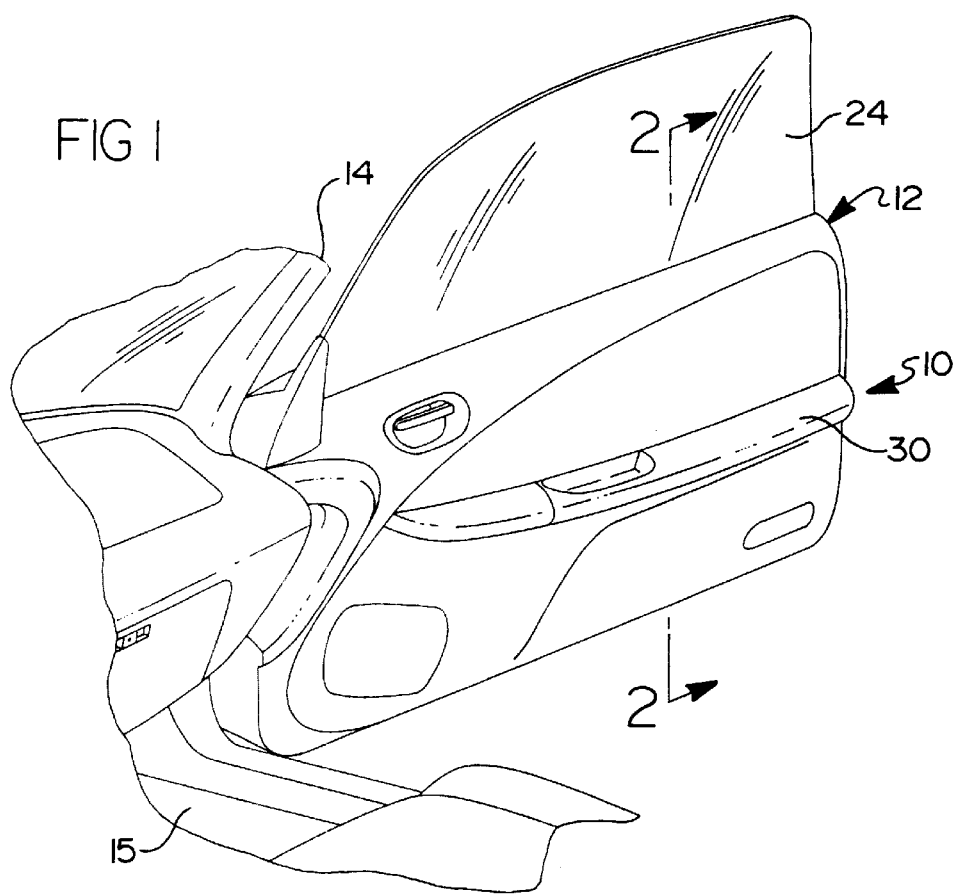
FIG. 1 is a perspective view of a trim panel assembly, according to the present invention, illustrated in operational relationship with a door of a motor vehicle.

Referring to FIG. 1, a trim panel assembly 10, according to the present invention, is illustrated in operational relationship with a door 12 of a motor vehicle 14 (partially shown) such as an automotive vehicle. The door 12 is used for opening and closing an occupant compartment 15 of the motor vehicle 14. It should be appreciated that the door 12 is moveable and connected to the remaining structure of the motor vehicle 14 as is known in the art.

Figure 2:
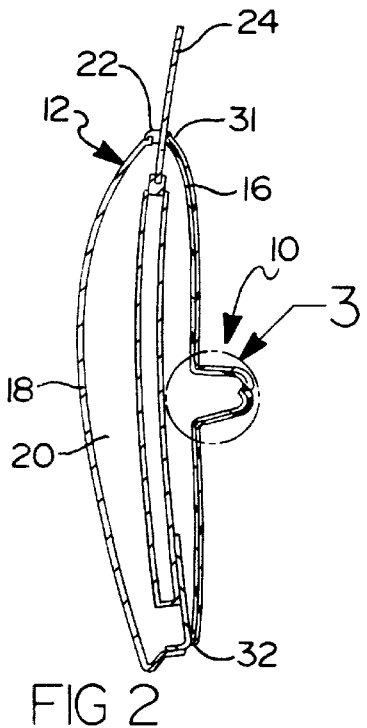
FIG. 2 is a sectional view taken along line 2—2 of FIG. 1.

Referring to FIG. 2, the door 12 includes an inner panel 16 and an outer panel 18 joined to the inner panel 16 in spaced relation by welding and hem flanging the peripheral edges thereof and forming a space or cavity 20 therebetween. The door 12 also includes an aperture 22 at an upper end for receiving a window 24. The window 24 moves in and out of the cavity 20 as is known in the art. It should be appreciated that the door 12 may include a window regulating mechanism, door latch and other components of a vehicle door as is known in the art.

Figure 3:
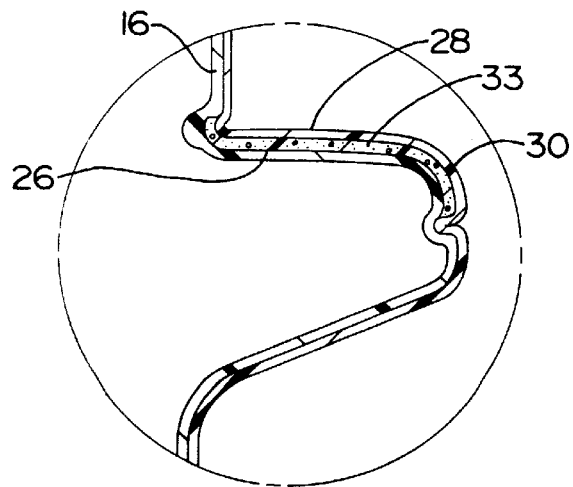
FIG. 3 is an enlarged view of circle 3 in FIG. 2.

Referring to FIGS. 2 and 3, the trim panel assembly 10, according to the present invention, is disposed adjacent and mounted on the inner panel 16. The trim panel assembly 10 includes a relatively thin trim panel substrate 26 extending vertically and longitudinally and attached to the inner panel 16 by suitable means such as fasteners (not shown). The trim panel substrate 26 is made of a suitable foam material such as a urethane foam. The trim panel assembly 10 also includes a relatively thin trim panel cover 28 extending vertically and longitudinally. The trim panel cover 28 is disposed adjacent the trim panel substrate 26 and attached to the trim panel substrate 26 by suitable means such as an adhesive. The trim panel cover 28 is made of a suitable material such as a relatively lightweight, soft, thin layer of vinyl, cloth or the like. Preferably, the trim panel cover 28 is formed from a die cut pad of vinyl material by conventional rule cutting as is known in the art.

The trim panel assembly 10 also includes an integral arm rest portion 30 disposed between an upper end 31 and lower end 32 of the trim panel substrate 26 and extending longitudinally and inwardly into the occupant compartment of the motor vehicle 14. The arm rest portion 30 is formed by the trim panel substrate 26 and trim panel cover 28. The arm rest portion 30 includes an arm rest pad 33 disposed between the trim panel cover 28 and trim panel substrate 26. The arm rest pad 33 extends longitudinally along an upper portion of the arm rest portion 30 and is wrapped inwardly therearound. The arm rest pad 33 is made of a relatively soft material such as vinyl. The relative softness of the arm rest portion 30 is dependent on the type and thickness of the material of the arm rest pad 33. In one embodiment, the arm rest pad 33 has a predetermined thickness such as 3.3 millimeter (mm) and is the same material, e.g. vinyl, as the trim panel cover 28. The arm rest pad 33 is attached to the trim panel cover 28 by suitable means such as an adhesive. The adhesive is a water based pressure sensitive adhesive to bond the arm rest pad 33 to the trim panel cover 28. It should be appreciated that the arm rest pad 33 must have a coating to promote adhesion to the urethane foam material. It should also be appreciated that the arm rest pad 33 and adhesive do not react with the urethane foam material of the trim panel substrate 26.

To form the trim panel assembly 10, a method of making the trim panel assembly 10, according to the present invention, for the door 12 of the motor vehicle 14 is disclosed. The method includes the steps of providing a trim panel cover 28 formed from a die cut pad of vinyl material. The method includes the steps of forming an arm rest portion 30 having a predetermined shape in the trim panel cover 28. The step of forming includes placing the trim panel cover in a vacuum mold and applying a vacuum to form the trim panel cover 28 to the predetermined shape. The method also includes the steps of providing an arm rest pad 33 formed of a vinyl material and bonding the arm rest pad 33 to an inner surface of the trim panel cover 28 by applying an adhesive to the arm rest pad 33 and inner surface of the trim panel cover 28. The method includes the steps of loading the trim panel cover 28 and arm rest pad 33 into a door trim cure tool (not shown) and molding a trim panel substrate 26 against the arm rest pad 33 and trim panel door 28 by injecting a urethane foam material against the inner surface of the arm rest pad 33 and trim panel cover 28 to form the trim panel substrate 26.

Accordingly, the trim panel assembly 10 of the present invention has a relatively soft integral arm rest pad 33 in a urethane foam trim panel substrate 26 covered by a trim panel cover 28. The trim panel assembly 10 of the present invention provides a relatively soft arm rest portion 30 without the need or cost of a separate add on arm rest.

The present invention has been described in an illustration manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of making a trim panel assembly for a door of a motor vehicle comprising the steps of:

providing a trim panel cover made of a vinyl material;

providing an arm rest pad formed of a vinyl material;

forming an arm rest portion in the trim panel cover by placing the trim panel cover in a vacuum mold and applying a vacuum to form the trim panel cover with the arm rest portion in a predetermined shape;

bonding the arm rest pad to an inner surface of the trim panel cover by applying an adhesive to the arm rest pad and an inner surface of the trim panel cover;

loading the trim panel cover and arm rest pad into a mold; and injecting a urethane foam material against an inner surface of the arm rest pad and trim panel cover and molding a trim panel substrate against the arm rest pad and trim panel cover.

* * * * *